US00RE38149E

(19) United States
(12) Reissued Patent
Dube et al.

(10) Patent Number: US RE38,149 E
(45) Date of Reissued Patent: Jun. 24, 2003

(54) CUTTER BLADE FOR PRODUCING HELICAL VEGETABLE STRIPS

(75) Inventors: Jocelyn A. Dube, St. Eleanors (CA); James D. Arbeau, St. Eleanors (CA); Michael D. Ryder, Summerside (CA); Derek J. Penney, Cornwall (CA); Layton D. McInnis, Albany (CA); Jean L. Lebel, St. Eleanors (CA)

(73) Assignee: McCain Foods Limited, Florenceville (CA)

(21) Appl. No.: 09/311,685

(22) Filed: May 13, 1999

Related U.S. Patent Documents

Reissue of:
(64) Patent No.: 5,619,897
Issued: Apr. 15, 1997
Appl. No.: 08/172,550
Filed: Dec. 23, 1993

(51) Int. Cl.[7] ..... B26D 3/11
(52) U.S. Cl. ..... 83/865; 83/356.3; 83/592; 83/672; 83/932
(58) Field of Search ..... 83/356.3, 592, 83/672, 862, 864, 932, 863, 865; 99/538; 241/92

(56) References Cited

U.S. PATENT DOCUMENTS

| | | | | | |
|---|---|---|---|---|---|
| 3,815,458 | A | * | 6/1974 | Jirousek | 83/83 |
| 4,644,838 | A | * | 2/1987 | Samson et al. | 83/865 |
| 4,704,959 | A | * | 11/1987 | Scallen | 99/538 |
| 4,979,418 | A | * | 12/1990 | Covert et al. | 83/865 |
| 5,042,342 | A | * | 8/1991 | Julian | 83/98 |
| 5,138,940 | A | * | 8/1992 | Geissler et al. | 99/538 |
| 5,167,178 | A | * | 12/1992 | Cimperman et al. | 83/865 |
| 5,201,259 | A | * | 4/1993 | Covert et al. | 83/865 |
| 5,211,098 | A | * | 5/1993 | Mendenhall | 83/865 |
| 5,293,803 | A | * | 3/1994 | Foster | 83/356.3 X |

FOREIGN PATENT DOCUMENTS

| | | | |
|---|---|---|---|
| CH | 296966 | * | 5/1954 |
| DE | 457822 | * | 3/1928 |
| DE | 1000577 | * | 6/1957 |
| EP | 377075 | | 7/1990 |
| EP | 514006 | | 11/1992 |
| EP | 540909 | * | 5/1993 |
| NL | 3869 | * | 8/1917 |

* cited by examiner

*Primary Examiner*—Charles Goodman
(74) *Attorney, Agent, or Firm*—Bereskin & Parr

(57) ABSTRACT

A cutter for cutting helical vegetable strips comprising a circular disk-like plate having an upstream surface and an axis of rotation. The cutter has a knife blade extending radially from the axis of rotation, the blade edge being axially displaced from the upstream surface. The cutter also includes a plurality of slitter blades spaced apart and located at different distances from the axis of rotation and extending substantially perpendicular to the upstream surface. The slitter blades have different lengths and, therefore, extend to different heights above the upstream surface.

21 Claims, 2 Drawing Sheets

CUTTER BLADE FOR PRODUCING HELICAL VEGETABLE STRIPS

Matter enclosed in heavy brackets [ ] appears in the original patent but forms no part of this reissue specification; matter printed in italics indicates the additions made by reissue.

BACKGROUND OF THE INVENTION

This patent application relates generally to an apparatus for mass producing helical vegetable strips, and specifically to a rotating cutter used on such an apparatus. French fried potatoes and other vegetables of generally spiral or helical shape have become increasingly popular. Consumers like them because of their interesting appearance, and they are appealing to institutional food providers and restaurateurs because a given volume of french fries has more plate coverage when they are of helical shape.

Systems for cutting helical french fries are currently available in the marketplace. The cutters in many of the systems are disk-like in nature; that is, the cutter which slices the potatoes or other vegetables into helical strips is generally a substantially flat or helical circular plate having a knife blade or "slabber blade" extending from the axis of rotation to the periphery of the disk. Mounted on the upstream face of the disk is a plurality of slitter blades. The slitter blades are located at different radii and sometimes are spaced with a radial pitch to one another. In the prior art, each of the slitter blades has substantially the same length. Therefore, each slitter blade extends approximately the same distance from the upstream face of the disk.

The previously described rotating cutters are used in conjunction with various feed systems to feed whole potatoes into the rotating cutter. One such feeding means is a hydraulic feed system. In such a system, potatoes are placed in a hydraulic medium which is pumped through a conduit. The outlet of the conduit is positioned to be in alignment with the rotating cutter. The potatoes are transported to the rotating cutter by the hydraulic medium.

The slitter blades determine the width of each helical potato strip to be cut. The slabber blade then cuts the thickness of each helical strip. The length of the helical strip is controlled by the length of the whole potato. Preferably, the slabber blade cuts a continuous helical strip the entire length of the potato.

One problem experienced with this type of system is ensuring that all of the potato is cut into helical strips. If the potato is not fully cut into helical strips, the uncut portion is scrap. The scrap potato is commonly referred to in the industry as a "butt end." Butt ends come from the portion of the potato that comes in contact with the cutter first. The primary cause of butt ends is the radial spacing of the slitter blades. As the potato is fed into the cutter at a high rate of speed, the slabber blade begins to cut the end of the potato, transversely to the longitudinal axis of the potato, before the slitter blades have had an opportunity to score the potato concentrically around the longitudinal axis. Because the innermost slitter blade is radially spaced the farthest away from the cutting edge of the slitter blade, it may not contact the potato until after the slabber blade has begun cutting the potato. The result is a butt end. In addition to being scrap, butt ends also tend to jam in the cutter and cause the yield of cut potatoes to be unnecessarily low.

SUMMARY OF THE INVENTION

It is, therefore, an important object of the invention to increase the yield of helical potato strips or other vegetable strips.

It is another object of the invention to reduce the number of butt ends of potatoes while cutting helical strips.

It is another object of the invention to reduce the potential for jamming potatoes or other vegetables in the cutter.

In summary, there is provided a cutter comprising a generally circular body which has a radial slit therein defining a pair of axially spaced cutting edges, a plurality of slitter blades which are radially spaced from each other and which extend axially from the face of the body, at least two of the slitter blades having different lengths.

The invention consists of certain novel features and a combination of parts hereinafter fully described, illustrated in the accompanying drawings and particular pointed out in the appended claims, it being understood that various changes in the details may be made without departing from the spirit or sacrificing any of the advantages of the present invention.

BRIEF DESCRIPTIONS OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
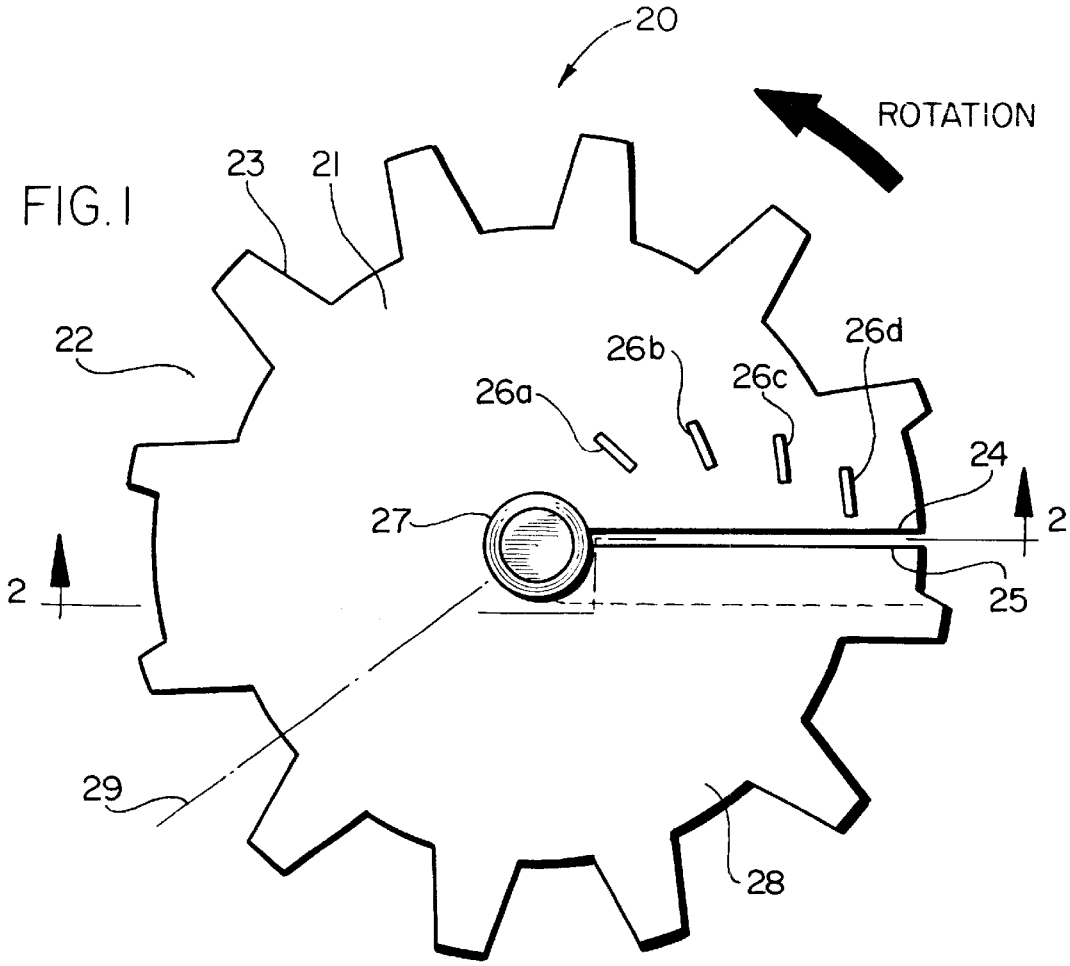
FIG. 1 is a plan view of a cutter for producing helical potato strips incorporating the features of the present invention.
Figure 2:
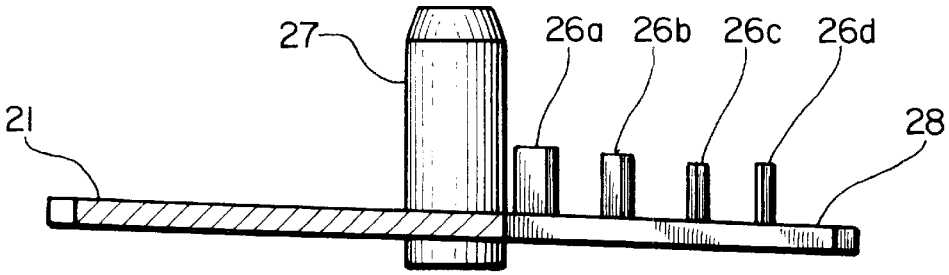
FIG. 2 is a section view taken along the line 2—2 of FIG. 1.
Figure 3:
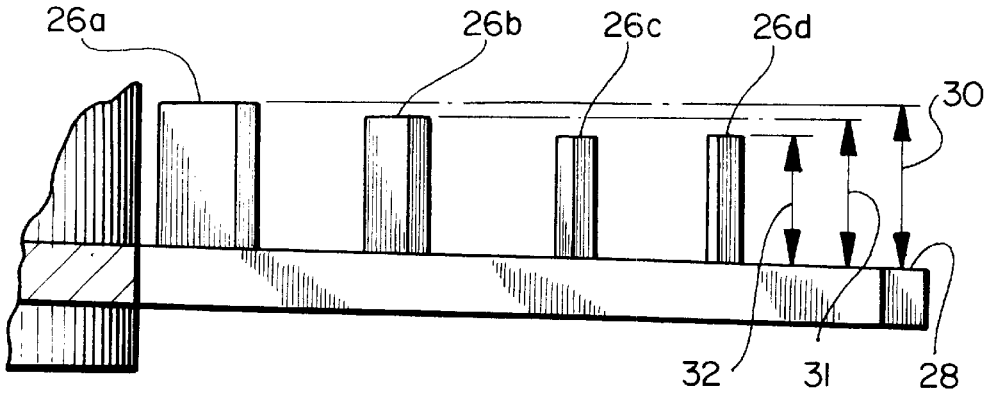
FIG. 3 is an enlarged view of a portion of FIG. 2.

Turning now to FIGS. 1 and 2, there is depicted a cutter 20 for cutting potatoes into generally helical shaped strips which cutter incorporates the features of the present invention. Cutter 20 comprises a circular body 21 having a plurality of slots 22 in its periphery, defining a plurality of radial projections 23. Body 21 is slit radially to produce a pair of edges 24 and 25 which are substantially parallel and axially displaced. The leading edge 25 is sharpened to create a slabber blade. In one embodiment of the present invention, body 21 had a substantially flat first part extending approximately 225° between edge 24 and phantom line 29 and a raised second part extending approximately 135° between edge 25 and phantom line 29. The raised second part forms the axially displaced edge 25. In another embodiment, body 21 was a right helicoid beginning at edge 25 and terminating at edge 24 and having a substantially uniform pitch therebetween.

Figure 4:
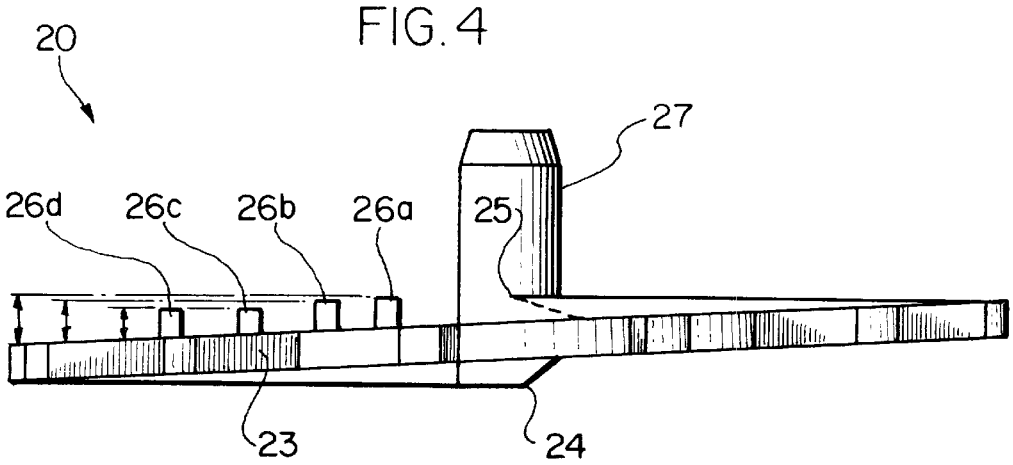
FIG. 4 is a side view of another embodiment of a cutter for producing helical vegetable strips incorporating the features of the present invention.

In either embodiment, a quill 27 projects axially from the center of body 21. Cutter 20 rotates counterclockwise, as viewed in FIG. 1. In the embodiment shown, mounted on the upstream surface 28 of cutter 20 are four slitter blades 26*a, b, c,* and *d*. Blade 26*a,* is innermost and leads blade 26*b*. Blade 26*c* is next and trails blade 26*b*. Blade 26*d* is outermost and trails blade 26*c*. In one operative embodiment, the angles between edge 24 and the mid points of blades 26*a, b, c* and *d* were respectively about 49°, 30°, 18° and 9°. In a particular embodiment (FIG. 4), blade 26*a* extends from surface 28 a distance 30 of approximately 0.395 inch, blade 26*b* extends above surface 28 a distance 31 of approximately 0.385 inch, and blades 26*c* and 26*d* are the same length, extending above surface 28 a distance 32 of approximately 0.365 inch.

Figure 5:
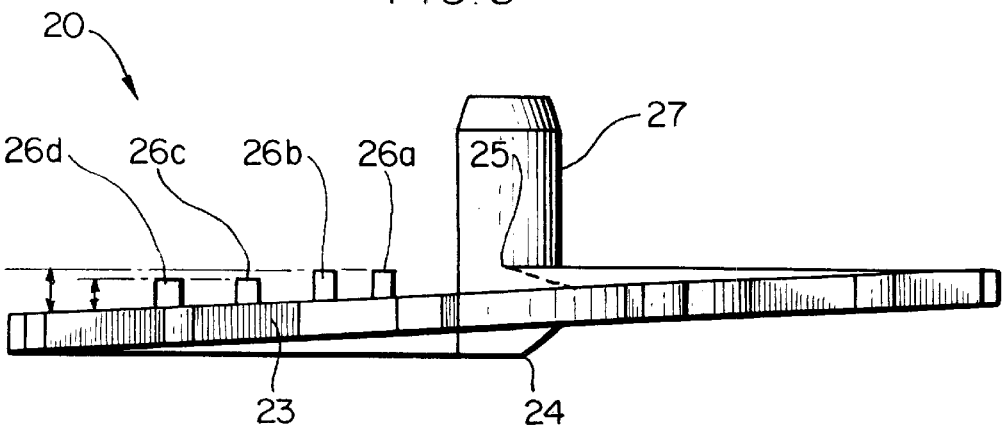
FIG. 5 is a side view of another embodiment of a cutter for producing helical vegetable strips incorporating the features of the present invention.

In another embodiment (FIG. 5) of the present invention, blades 26*a* and 26*b* had the same length, and blades 26*c* and 26*d* had the same length, but shorter than that of blades 26*a* and 26*b*. Specifically, each of blades 26*a* and *b* had a length of 0.395 inch and each of blades 26*c* and 26*d* had a length of 0.365 inch.

This construction increases the yield of cutter 20 by reducing scrap pieces, such as butt ends. In operation, a potato is propelled into cutter 20 by a feed means (not shown). As the potato approaches cutter 20, it first contacts quill 27 which keeps the potato aligned. The point of slitter blade 26*a* first makes contact with the from end of the potato during the first rotation of cutter 20, because of its longer length, in the first embodiment, and blade 26*a* begins scoring or cutting the potato concentrically about the longitudinal axis of the potato forming slits or grooves of predetermined width in the potato surface. The blade 26*b* starts cutting the potato. Finally, blades 26*c* and 26*d* start to cut. As the potato continues to be fed into cutter 20, it contacts edge 25 which begins cutting the potato transversely to the longitudinal axis of the potato, thereby, forming a helical strip. It will be appreciated by those skilled in the art, that the number of slitter blades may vary to include more or less than four as a particular application may require. In addition, the length of the slitter blades may vary as required by a particular application.

What has been described therefore is an improved cutter for cutting vegetables into helical strips incorporating slitter blades having varying heights. The yield of potatoes cut into helical strips is substantially increased by reducing non-helical potatoes slices, such as butt ends, by 95% or more.

While a preferred embodiment of the present invention has been described, it is to be understood that the scope of the invention is defined by the following claims.

What is claimed is:

1. A rotating cutter for cutting helical vegetable strips comprising:

(a) a disk-shaped body having an upstream surface and an axis of rotation;

(b) a knife blade extending radially from the axis of rotation and being axially displaced from said upstream surface;

(c) a plurality of slitter blades extending substantially perpendicular to said upstream surface;

(d) said slitter blades being spaced apart from one another and located at different distances from the axis of rotation;

(e) at least two of said slitter blades having different lengths *with respect to a plane perpendicular to the axis of rotation.*

2. The cutter of claim 1, wherein at least three of said slitter blades have different lengths.

3. The cutter of claim 1, wherein a difference in length between at least two of said slitter blades is approximately 0.010 inches.

4. The cutter of claim 1, wherein the disk-shaped body has a leading edge and a trailing edge, and the disk-shaped body comprises a substantially flat first portion extending approximately 225° from the trailing edge and a raised second portion extending approximately 135° from the leading edge.

5. The cutter of claim 1, wherein the periphery of said [disk-like] *disc-shaped* body is substantially helical.

6. The cutter of claim 5, wherein said periphery has a substantially uniform pitch.

7. The cutter of claim 1, wherein said plurality of slitter blades includes an innermost slitter blade, an outermost slitter blade and an intermediate slitter blade.

8. The cutter of claim 7, wherein the innermost slitter blade is the longest.

9. The cutter of claim 8, wherein said outermost slitter blade and said intermediate slitter blade have the same length.

10. The cutter of claim 8, wherein the distance between said innermost blade and said knife blade is smaller than the distance between said knife blade and said outermost blade.

11. The cutter of claim 7, wherein said innermost slitter blade and said intermediate slitter blade have the same length.

12. The cutter of claim 7, wherein said slitter blade lengths progressively decrease from said innermost slitter blade to said outermost slitter blade.

13. The cutter of claim 12, wherein the difference in length between each said slitter blade is approximately 0.010 inches.

14. The cutter of claim 1, wherein said plurality of slitter blades includes an innermost slitter blade, an outermost slitter blade, an intermediate slitter blade adjacent the innermost slitter blade, and an intermediate slitter blade adjacent the outermost slitter blade.

15. The cutter of claim 14, wherein said innermost slitter blade and said intermediate slitter blade adjacent the innermost slitter blade have the same length.

16. The cutter of claim 14, wherein said outermost slitter blade and said intermediate slitter blade adjacent said outermost slitter blade have the same length.

17. The cutter of claim 14, wherein the length of said intermediate slitter blade adjacent said innermost slitter blade is less than the length of said innermost slitter blade but greater than the length of said intermediate slitter blade adjacent said outermost slitter blade.

18. The cutter of claim 17, wherein the length of said innermost slitter blade is approximately 0.395 inch.

19. The cutter of claim 17, wherein the length of said intermediate slitter blade adjacent said innermost slitter blade is approximately 0.385 inch.

20. The cutter of claim 17, wherein the length of said intermediate slitter blade adjacent said outermost slitter blade is approximately 0.365 inches.

21. The cutter of claim 1, wherein at least one of said slitter blades is located a different distance from said knife blade than another of said blades.

* * * * *